United States Patent [19]

Wilson et al.

[11] Patent Number: 4,664,878
[45] Date of Patent: May 12, 1987

[54] LIGHT WATER MODERATOR FILLED ROD FOR A NUCLEAR REACTOR

[75] Inventors: John F. Wilson; Pratap K. Doshi, both of Murrysville Boro; Samuel Cerni, Churchill Boro., all of Pa.

[73] Assignee: Westinghouse Electric Corp., Pittsburgh, Pa.

[21] Appl. No.: 654,709

[22] Filed: Sep. 26, 1984

[51] Int. Cl.⁴ .......................... G21C 5/00; G21C 7/26
[52] U.S. Cl. .................... 376/328; 376/220; 376/418; 376/447; 376/209; 376/327
[58] Field of Search ............... 376/220, 327, 447, 209, 376/444, 443, 412, 418, 426, 328

[56] References Cited

U.S. PATENT DOCUMENTS

| 3,125,493 | 3/1964 | D'Amore | 376/426 |
|---|---|---|---|
| 3,141,830 | 7/1964 | Klepfer | 376/418 |
| 3,382,153 | 5/1968 | Bigge et al. | 376/447 |
| 3,580,809 | 5/1971 | Williams et al. | 376/412 |
| 3,745,069 | 7/1973 | Sofer et al. | 376/327 |
| 3,804,708 | 4/1974 | Nilson . | |
| 3,804,710 | 4/1974 | Bresnick | 376/412 |
| 3,959,072 | 5/1976 | Dupen . | |
| 3,994,778 | 11/1976 | Grover et al. . | |
| 4,000,013 | 12/1976 | MacEwen et al. . | |
| 4,046,631 | 9/1977 | Clapham . | |
| 4,065,352 | 12/1977 | Iwano et al. . | |
| 4,108,687 | 8/1978 | Armand et al. . | |
| 4,169,759 | 10/1979 | Bevilacqua | 376/333 |
| 4,238,251 | 12/1980 | Williams et al. . | |
| 4,391,771 | 7/1983 | Anthony . | |
| 4,432,934 | 2/1984 | Gjertsen et al. . | |
| 4,460,540 | 7/1984 | Funk et al. | 376/327 |
| 4,508,679 | 4/1985 | Matzner et al. | 376/444 |

FOREIGN PATENT DOCUMENTS

| 3301965 | 7/1984 | Fed. Rep. of Germany | 376/447 |
|---|---|---|---|
| 998540 | 7/1965 | United Kingdom | 376/209 |

Primary Examiner—Harvey E. Behrend

[57] ABSTRACT

A non-boron moderator filled rod for a nuclear reactor fuel assembly has a tubular body with a pair of end plugs sealing the opposite ends thereof and defining a chamber within the body. A liquid moderator, such as light water, is contained witin the chamber. One of the end plugs acts as a hydride sink and a hydrogen getter sponge material is disposed adjacent the other end plug.

3 Claims, 3 Drawing Figures

LIGHT WATER MODERATOR FILLED ROD FOR A NUCLEAR REACTOR

CROSS REFERENCE TO RELATED APPLICATION

Reference is hereby made to the following co-pending United States patent application dealing with subject matter related to the present invention: "Soluble Burnable Absorber Rod For A Nuclear Reactor" by P. K. Doshi et al, U.S. Ser. No. 654,625, filed Sept. 26, 1984.

BACKGROUND OF THE INVENTION

1. Field of the Invention

The present invention relates generally to nuclear reactors and, more particularly, is concerned with a moderator filled rod for a fuel assembly having a construction which enhances the effectiveness and reliability of the rod and which also extends its useful life.

2. Description of the Prior Art

In a typical nuclear reactor, such as the pressurized-water type (PWR), an excessive amount of reactivity is designed into the reactor core at start-up so that as the reactivity is depleted over the life of the core there will still be sufficient reactivity to sustain core operation over a long period of time. Commonly, burnable poison or neutron absorber rods are used in the reactor core during the first cycle or beginning of life (BOL) of the reactor core in order to reduce excess reactivity. Poison material has high-absorption cross section that absorbs neutrons unproductively so as to reduce the reactivity of the reactor. After the excessive reactivity has depleted, then, during the second cycle of reactor operation, no devices are added to modify the level of reactivity. Once reactivity has decreased still further, then finally, in the third cycle or end of life (EOL) of the reactor operation, additional moderator is introduced to increase the reactivity of the core. Moderator material slows down neutrons from the high energies at which they were released. The neutrons lose energy by scattering collisions with nuclei of the moderator. Slow neutrons or ones whose energies have been reduced to the thermal energy range have a better probability than fast ones of causing nuclear reactions. Thus, reduction of the speed of fast neutrons serves to increase reactivity.

Therefore, in PWR fuel assemblies that have been irradiated to near EOL condition, e.g. third cycle fuel assemblies, it is desirable to exclude borated reactor coolant—which contains poison or neutron absorbing material—from the assemblies and to increase the amount of moderator in the fuel assemblies. One prior method of partially accomplishing this is to just remove several fuel rods from these assemblies at the beginning of the third cycle. Then, the empty space allows additional amounts of the moderator/coolant liquid mixture to be introduced into the core. However, while this increases the amount of moderator in the fuel assemblies, it does not reduce the amount of poison (borated coolant) in the assemblies; in fact, it increases the amount of poison since a proportional increase in the amount of borated coolant in the fuel assemblies accompanies the increase in the amount of the moderator.

Consequently, a need exits for a more effective way to introduce moderator into the reactor core at the beginning of its EOL or third cycle.

SUMMARY OF THE INVENTION

The present invention provides a moderator filled rod designed to satisfy the aforementioned need. The present invention provides, in a first embodiment, moderator filled rods which fit into guide thimbles and, in a second embodiment, moderator rods which replace fuel rods. Unlike the prior method wherein both the amount of moderator and borated coolant (poison) are increased at the start of the third cycle or EOL of reactor core operation, the rods of the present invention displace borated coolant and at the same time increase the amount of moderator. The rods are reuseable and can be used separately in different fuel assemblies or in combination with each other in the same fuel assemblies. In other words, in one approach, the moderator filled rod of the invention designed in accordance with the first embodiment herein is inserted into the guide thimble in the same way that burnable poison rods are used. In the other approach, some of the fuel rods are removed and replaced by the rods designed in accordance with the second embodiment herein. It is also possible to combine these two approaches in the same fuel assembly. Light water having high scattering cross section and low atomic weight is the preferred moderator used in the rods of the present invention. It is expected that use of these moderator rods will reduce fuel cycle costs by one to three percent depending on the number used.

Accordingly, the present invention sets forth in a fuel assembly for a nuclear reactor, a moderator rod comprised of: (a) an elongated hollow tubular member having opposite ends and a hermetically sealed chamber defined therein between its ends; (b) a boron-free moderator contained in the sealed chamber withing the tubular member; (c) means providing a hydride sink disposed at one end of the tubular member and in communication with the sealed chamber; and (d) means providing a hydrogen getter disposed at the other end of the tubular member and in communication with the sealed chamber.

More particularly, the moderator is preferably light water, although heavy water or Zirc hydride could also be used if their nuclear characteristics match the reactor core requirements. The use of water moderator requires the prepressurization of the chamber with helium so that the partial pressures of steam and helium internal of the rod will combine to approximately equal the reactor core operating pressure external of the rod. Further, the tubular member is formed by a tubular body of thin wall construction and a pair of end plugs attached to the opposite ends of the body so as to hermetically seal the same. The material composing the tubular body and end plugs is preferably Zircaloy-4. To reduce corrosion of the inside of the tubular member, the material is beta quenched. The solid lower end plug provides the means serving as the hydride sink for free hydrogen released by the corrosion or oxidation of the inside of the tubular member. Adjacent the upper end plug is positioned the means providing the hydrogen getter. The getter takes the form of a Zircaloy sponge adapted to remove hydrogen from the chamber of the tubular member. The sponge is retained at the upper end against the plug by a disc or washer which has a central opening for allowing passage of the hydrogen gas to the sponge and is held against the sponge by a circumferential bulge formed in the body of the tubular member.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
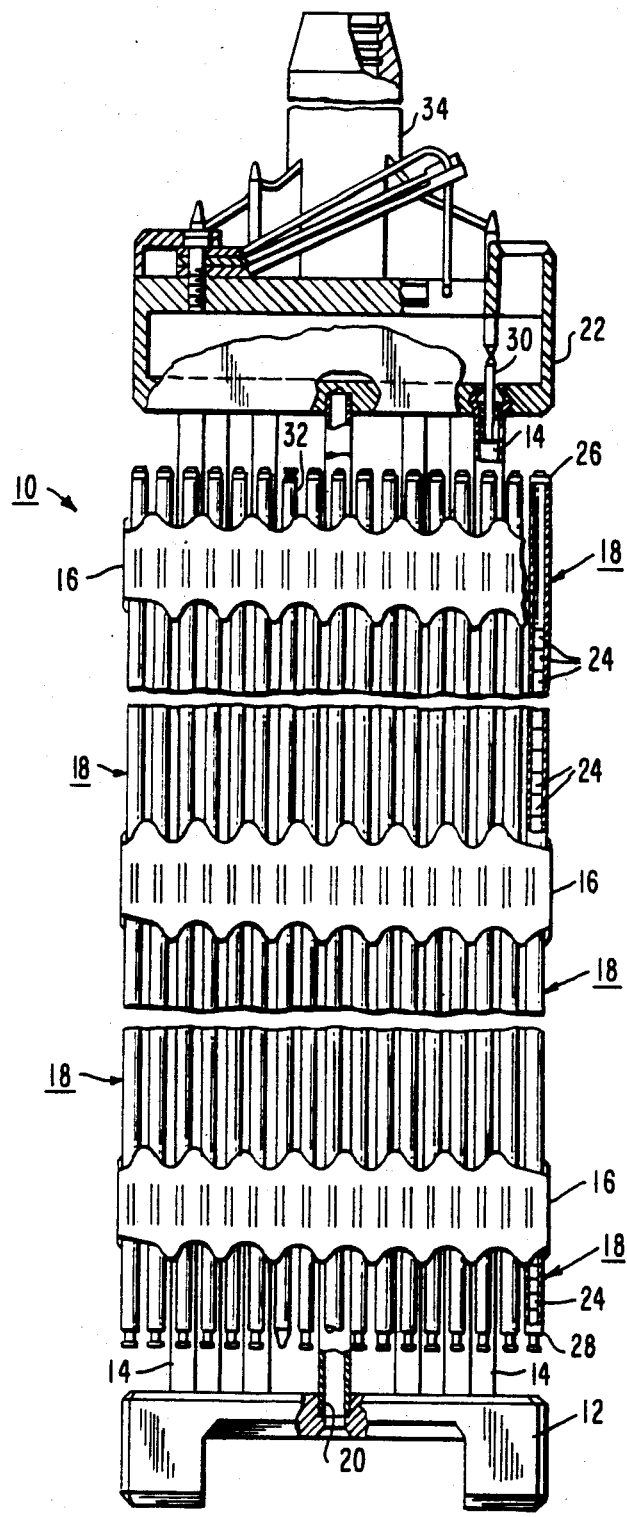
FIG. 1 is an elevational view, partly in section, of a fuel assembly which incorporates each embodiment of the boron-free moderator filled rod of the present invention, the assembly being illustrated in vertically foreshortened form with parts broken away for clarity.

In the following description, like reference characters designate like or corresponding parts throughout the several views of the drawings. Also, in the following description, it is to be understood that such terms as "forward", "rearward", "left", "right", "upwardly", "downwardly", and the like, are words of convenience and are not to be construed as limiting terms.

In General

Referring now to the drawings, and particularly to FIG. 1, there is shown an elevational view of a fuel assembly, represented in vertically foreshortened form and being generally designated by the numeral 10. The fuel assembly 10 is the type used in a pressurized water reactor (PWR) and basically includes a lower end structure or bottom nozzle 12 for supporting the assembly on the lower core plate (not shown) in the core region of a reactor (not shown), and a number of longitudinally extending guide tubes or thimbles 14 which project upwardly from the bottom nozzle 12. The assembly 10 further includes a plurality of transverse grids 16 axially spaced along the guide thimbles 14 and an organized array of elongaged fuel rods 18 transversely spaced and supported by the grids 16. Also, the assembly 10 has an instrumentation tube 20 located in the center thereof and an upper end structure or top nozzle 22 attached to the upper ends of the guide thimbles 14. With such an arrangement of parts, the fuel assembly 10 forms an integral unit capable of being conveniently handled without damaging the assembly parts.

As mentioned above, the fuel rods 18 in the array thereof in the assembly 10 are held in spaced relationship with one another by the grids 16 spaced along the fuel assembly length. Each fuel rod 18 includes nuclear fuel pellets 24 and the opposite ends of the rod are closed by upper and lower end plugs 26,28. The fuel pellets 24 composed of fissile material are responsible for creating the reactive power of the PWR. A liquid moderator/coolant such as water, or water containing boron, is pumped upwardly through the fuel assemblies of the core in order to extract some of the heat generated therein for the production of useful work.

Boron-Free Moderator Filled Rod

Figure 2:
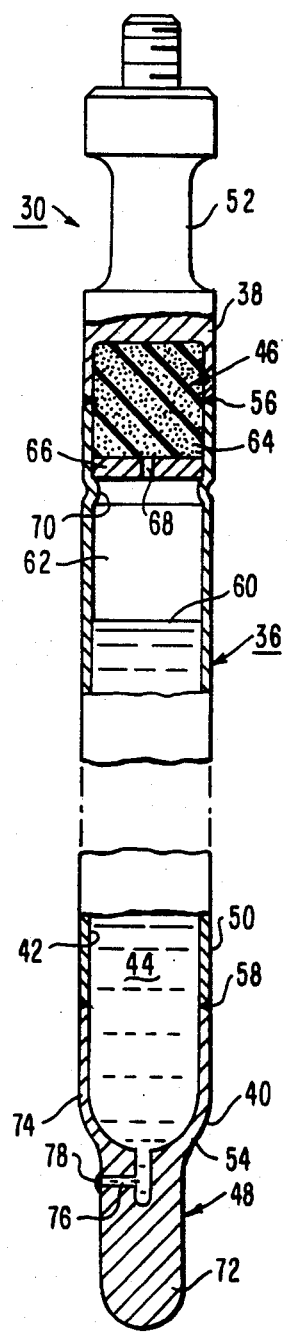
FIG. 2 is an enlarged, vertically foreshortened, sectional view of the first embodiment of the moderator rod of the present invention for insertion into a guide thimble in the fuel assembly.
Figure 3:
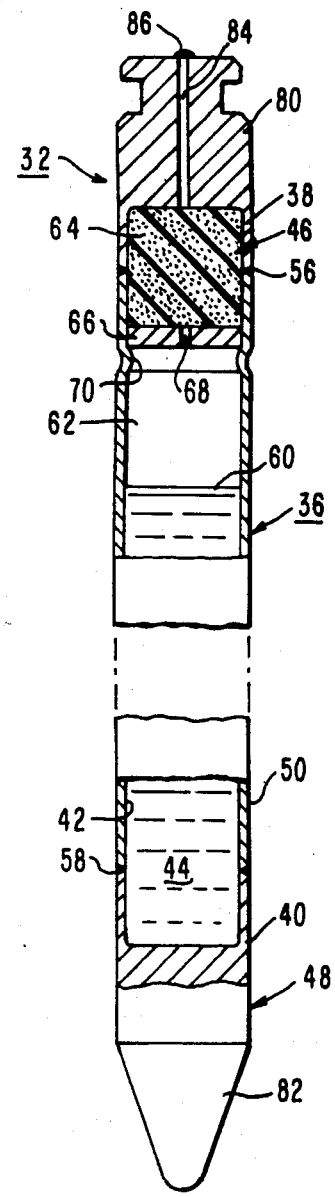
FIG. 3 is an enlarged, vertically foreshortened, sectional view of the second embodiment of the moderator rod of the present invention for replacement of a fuel rod in the fuel assembly.

In the operation of a PWR it is desirable to prolong the life of the reactor core as long as feasible to better utilize the uranium fuel and thereby reduce fuel costs. To attain this objective, heretofore it has been common practice to provide means to shift the neutron energy spectrum to lower energies, as the core ages, to increase the reactivity thereof. While such past practices have generally involved removal of rods which were used to initially displace some of the moderator water during the first cycle, the present invention relates to a moderator filled rod designed to be inserted into the fuel assembly at the start of the third cycle to increase the number of thermal neutrons and thereby the reactivity of the core. A first embodiment of the moderator rod, generally designated 30 and illustrated in FIG. 2, is adapted to be inserted into a guide thimble 14, as seen in FIG. 1. A second embodiment of the moderator rod, generally designated 32 and illustrated in FIG. 3, is adapted to be substituted for one of the fuel rods 18 in the assembly 10, as also seen in FIG. 1. At least one, and preferably several of the moderator rods 30 are stationarily supported by a spider 34 in the guide thimbles 14 of some of the fuel assemblies 10, while one or more of the moderator rods 32 are substituted for one or more of the fuel rods 18 in the same or different ones of the fuel assemblies 10.

Referring now to FIG. 2, the moderator rod 30 basically includes an elongated hollow tubular member 36 having upper and lower opposite ends 38,40 and a hermetically sealed plenum or chamber 42 defined within the tubular member between its ends. A boron-free moderator liquid 44, such as light water, is contained in the sealed chamber 42 of the tubular member 36. At the upper end 38 of the tubular member 36 is means 46 providing a hydrogen getter and being disposed in communication with the sealed chamber 42 for a purpose to be described later below. At the other, lower end 40 of the tubular member 36 is means 48 providing a hydride sink and also being disposed in communication with the sealed chamber 42 for a purpose also to be described hereafter.

The tubular member 36 is formed by a tubular body 50 and a pair of upper and lower end plugs 52,54, which are composed of any suitable material, but preferably a zirconium-based alloy such as Zircaloy-4. The plugs 52,54 are rigidly attached, such as by girth welds 56,58 to the opposite ends of the tubular body 50 so as to hermetically seal the same. To maximize the amount of moderator 44 in the rod 30 it is desirable to minimize the wall thickness of the body 50.

The liquid moderator 44 is preferably light water, although heavy water or Zirc hydride could also be used if their nuclear characteristics match the reactor core requirements. The use of water moderator requires the prepressurization of the chamber 42 with helium so that the partial pressures of steam and helium internal of the chamber 42 will combine to approximately equal the reactor core operating pressure external of the chamber 42. For example, if the operating temperature is 600 degrees F, the partial pressure of steam will be approximately 1550 psig. Since the reactor core pressure is 2250 psig, it will be necessary to prepressurize the plenum or chamber 42 with helium up to approximately 700 psig. This prepressurization will minimize the differential pressure across the tubular body (cladding) 50 which will result in low clad stresses. This will minimize the tendency of the Zircaloy to undergo thermal and irradiation induced creep.

Parenthetically, it should be mentioned that the liquid moderator 44 does not fill the entire chamber 42 during non-operating periods, but only up to the level indicated by the numeral 60. This is so because the specific volume of the liquid will change with temperature. In going from 100 degrees F to 600 degrees F, water increases in volume by 45%. Thus, there is a vapor space 62 present in the chamber 42.

The use of moderator water 44 in the sealed chamber 42 causes concern about possible corrosion and hydriding of the material of the tubular member 36. Corrosion (or oxidation) of the inside surfaces produces hydrogen, some of which enters the Zircaloy material to form Zirc hydride. High levels of Zirc hydride results in Zircaloy embrittlement and can also cause through-the-wall tube failure due to formation of hydride blisters.

To minimize corrosion of the inside of the tubular member 36, its material is beta quenched and preoxidated. This will minimize oxidation and hydride formation during reactor operation. Also, to minimize hydride buildup, the lower end plug 54 contains a large volume of solid Zircaloy which serves as means 48 providing the hydride sink. Since this end of the member 36, being the lower one, is the cooler, the hydrogen will tend to migrate toward it. Since the chamber 42 of the rod 30 will be in the low irradiation region of the reactor core, it is desirable to have another means of removing excess hydrogen. Such means is the hydrogen getter means 46. The upper end plug 52 is an attachment fitting for connecting the rod 30 to the spider 34, and adjacent to it is positioned the hydrogen getter means 46. The preferred form of the means 46 is a Zircaloy sponge 64 which is porous and has a high surface to volume ratio. It is adapted to remove hydrogen from the vapor space 62 in the chamber 42 of the member 36. The sponge 64 is retained adjacent the upper end plug 52 by an annular Zircaloy washer or disc 68 which has a central opening 68 for allowing passage of the hydrogen gas to the sponge 64. The disc 66 is held against the sponge 64 by a inwardly-protruding circumferential bulge 70 formed in the body 50 of the tubular member 36.

Since it is desirable to make the rod 30 as large as possible, and still be able to insert and withdraw it from the guide thimble 14, the rod is provided with two diameters. The lower portion 72 of the lower end plug 54 is smaller in diameter than the upper portion 74 thereof and than the main portion of the rod, that being the tubular body 50. Thus, the lower end plug portion 72 will fit into the dashpot (not shown) at the bottom of the guide thimble 14. This design allows approximately 25% more volume than if a single diameter rod is used. Also, an inlet fill passage 76 is defined in the plug 54 to use in prepressurizing the rod 30. After pressurizing, the hole is closed by a weld 78.

A similar moderator rod 32, designed to fit into a fuel rod space, is shown in FIG. 3. It is substantially identical to the rod 30 of FIG. 2, except for its upper and lower end plugs 80,82. Since most parts of rod 32 are identical to those of rod 30, these parts are assigned the same numerals and description thereof will not be repeated. The rod 32 has the same outside diameter as the fuel rod 18. Its lower end plug 82 which provides the hydride sink means 48 has a large tapered shape, while its upper end plug 80 is shaped to fit a handling tool (not shown). The fill passage 84 which is used for prepressurizing the rod 32 with helium and then is closed by weld 86 is defined in the upper end plug 80.

It is thought that the boron-free moderator filled rod of the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

We claim:

1. A neutron moderator filled rod, comprising:
   (a) an elongated hollow tubular member having opposite ends and a hermetically sealed chamber defined therein between its said opposite ends, said chamber being prepressurized with an inert gas, said tubular member including
      (i) a tubular body of thin wall construction, and
      (ii) a pair of end plugs attached to opposite ends of said body so as to hermetically seal the same and define said chamber in said member, one of said end plugs being provided with a passageway to allow pressurization of said chamber, said passageway being closed after said chamber has been pressurized;
   (b) a boron-free moderator in liquid form partially filling said sealed chamber within said tubular member to a predetermined level leaving a vapor space between said predetermined level and an uuper one of said end plugs, said moderator being free of neutron poison material;
   (c) means providing a hydride sink disposed at the lower end of said tubular member and in communication with said sealed chamber, said sink being provided by one of said end plugs of said tubular member; and
   (d) means providing a hydrogen getter disposed in said vapor spaced adjacent said upper end plug at the upper end of said tubular member and in communication with said sealed chamber, said means providing said getter being spaced above said predetermined level and being in the form of
      (i) a sponge of getter material disposed adjacent the upper end plug of said tubular member,
      (ii) a retainer in the form of an annular disc disposed between said sponge and said chamber for positioning said sponge within said member and having a passageway formed therein for providing communication between said chamber and said sponge, and
      (iii) a circumferential bulge formed in said body holding said disc against said sponge.

2. The moderator filled rod as recited in claim 1, wherein said boron-free moderator is light water.

3. A boron-free moderator filled rod, comprising:
   (a) an elongated hollow tubular member having opposite ends and a hermetically sealed chamber defined therein between its ends, said chamber being prepressurized with an inert gas;
   (b) said tubular member being formed by a tubular body of thin wall construction and a pair of end plugs attached to opposite ends of said body so as to hermetically seal the same and define said chamber in said member, one of said end plugs being provided with a passageway to allow prepressurization of said chamber, said passageway being closed after said chamber has been pressurized;

(c) a quantity of light water moderator partially filling said chamber to a predetermined level leaving a vapor space between said predetermined level and an upper one of said end plugs, said moderator being free of neutron poison material;

(d) hydrogen getter means in said tubular member and in communication with said chamber, said getter means being in the form of a getter sponge disposed in said vapor space adjacent an upper one of said end plugs of said member, an annular disc retaining said sponge and having a passageway for communication of hydrogen from said chamber to said sponge, and a circumferential bulge formed in said body for holding said disc against said sponge; and (e) hydride sink means in said tubular member and in communication with said chamber, said sink means being in the form of a lower one of said end plugs of said member.

* * * * *